(12) United States Patent
Masui et al.

(10) Patent No.: US 12,509,078 B2
(45) Date of Patent: Dec. 30, 2025

(54) VEHICLE CONTROL DEVICE

(71) Applicants: DENSO CORPORATION, Kariya (JP); TOYOTA JIDOSHA KABUSHIKI KAISHA, Toyota (JP)

(72) Inventors: Youhei Masui, Kariya (JP); Naoki Kusumoto, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/315,226

(22) Filed: May 10, 2023

(65) Prior Publication Data

US 2023/0271611 A1 Aug. 31, 2023

Related U.S. Application Data

(63) Continuation of application No. PCT/JP2021/037829, filed on Oct. 13, 2021.

(30) Foreign Application Priority Data

Nov. 13, 2020 (JP) ................................. 2020-189181

(51) Int. Cl.
*B60W 30/16* (2020.01)
*B60W 30/09* (2012.01)
*B60W 50/14* (2020.01)

(52) U.S. Cl.
CPC ............ *B60W 30/16* (2013.01); *B60W 30/09* (2013.01); *B60W 50/14* (2013.01); *B60W 2420/403* (2013.01); *B60W 2554/00* (2020.02)

(58) Field of Classification Search
CPC ...... B60W 30/16; B60W 30/09; B60W 50/14; B60W 2554/00; B60W 2420/403
See application file for complete search history.

(56) References Cited

U.S. PATENT DOCUMENTS 6,236,929 B1 * 5/2001 Sen .......................... F16H 61/21
701/87
6,339,740 B1 * 1/2002 Seto ..................... B60K 31/047
340/904

(Continued)

FOREIGN PATENT DOCUMENTS

JP 2004-243788 A 9/2004
JP 2006298254 A * 11/2006

(Continued)

*Primary Examiner* — Dale W Hilgendorf
*Assistant Examiner* — Hana Lee
(74) *Attorney, Agent, or Firm* — Maschoff Brennan

(57) ABSTRACT

A vehicle control device is provided for a vehicle equipped with a high-accuracy sensor and a low-accuracy sensor to detect a preceding vehicle. The low-accuracy sensor is able to detect a distance to a preceding vehicle larger than a maximum distance to a preceding vehicle detectable by the high-accuracy sensor, and having low ranging accuracy. A control unit is configured to perform following control in which the vehicle is controlled so as not to collide with the preceding vehicle, using at least either of a first detection information derived from the high-accuracy sensor and a second detection information derived from the low-accuracy sensor, and further configured to, when performing the following control using only the second detection information, reduce a degree of change in vehicle control that is based on the second detection information, as compared to when performing the following control using the first detection information.

19 Claims, 5 Drawing Sheets

(56) References Cited

U.S. PATENT DOCUMENTS

| | | | |
|---|---|---|---|
| 2007/0168128 A1* | 7/2007 | Tokoro | G01S 13/867 |
| | | | 701/301 |
| 2012/0253628 A1* | 10/2012 | Maruyama | B60W 50/085 |
| | | | 701/93 |
| 2015/0251600 A1 | 9/2015 | Mochizuki et al. | |
| 2020/0369274 A1* | 11/2020 | Mizuno | G01S 13/867 |
| 2021/0316728 A1* | 10/2021 | Won | B60W 30/165 |

FOREIGN PATENT DOCUMENTS

| | | |
|---|---|---|
| JP | 2016-048562 A | 4/2016 |
| JP | 2017-043292 A | 3/2017 |
| JP | 2017-047710 A | 3/2017 |
| JP | 2019-137316 A | 8/2019 |

* cited by examiner

VEHICLE CONTROL DEVICE

CROSS-REFERENCE TO RELATED APPLICATION

This application is a continuation application of International Application No. PCT/JP2021/037829 filed Oct. 13, 2021 which designated the U.S. and claims priority to Japanese Patent Application No. 2020-189181 filed with the Japan Patent Office on Nov. 13, 2020, the contents of each of which are incorporated herein by reference.

BACKGROUND

Technical Field

The present disclosure relates to vehicle control devices.

Related Art

As vehicle control devices, there are known devices that control vehicles using information detected by high-accuracy sensors, such as millimeter-wave radar devices, and information detected by low-accuracy sensors, such as cameras, whose distance detection accuracy is lower than that of high-accuracy sensors. For example, a technique is known for determining a vehicle acceleration according to the detection information of sensors.

DESCRIPTION OF SPECIFIC EMBODIMENTS

In the known technique as disclosed in JP 2019-137316 A, there may be a risk that the information detected by a high-accuracy sensor diverges from the information detected by a low-accuracy sensor. Therefore, there may be a risk that the control details in the case of using only the information detected by a low-accuracy sensor because of the information detected by high-accuracy sensors being unavailable, diverge from the control details in the case of the information detected by a high-accuracy sensor being available. In this case, when switching the control using only a low-accuracy sensor to the control using a high-accuracy sensor, change in speed or acceleration of the vehicle, for example, may be significant and may cause discomfort to the occupants. Therefore, there has been a need for a technique for reducing discomfort when switching control between the control using only a low-accuracy sensor and the control using a high-accuracy sensor.

The present disclosure has been made in light of the above issues, and can be achieved in the following modes.

One aspect of the present disclosure provides a vehicle control device for a vehicle equipped with a high-accuracy sensor and a low-accuracy sensor to detect a preceding vehicle, the low-accuracy sensor being able to detect a distance to a preceding vehicle larger than a maximum distance to a preceding vehicle detectable by the high-accuracy sensor, and having low ranging accuracy. In the vehicle control device, an acquisition unit is configured to acquire first detection information derived from the high-accuracy sensor and second detection information derived from the low-accuracy sensor. A control unit is configured to perform following control in which the vehicle is controlled so as not to collide with the preceding vehicle, using at least either of the first detection information and the second detection information. The control unit is further configured to, when performing the following control using only the second detection information, reduce a degree of change in vehicle control that is based on the second detection information, as compared to when performing the following control using the first detection information.

According to the vehicle control device configured as above, control details are prevented from greatly changing in the control using only the second detection information. Therefore, drastic change can be suppressed when switching the following control using both of the first detection information having high ranging accuracy and the second detection information having low ranging accuracy, to the following control using only the second detection information having low ranging accuracy. Accordingly, discomfort can be eased when switching between the control using only the low-accuracy sensor and control using the high-accuracy sensor.

A. First Embodiment

Figure 1:
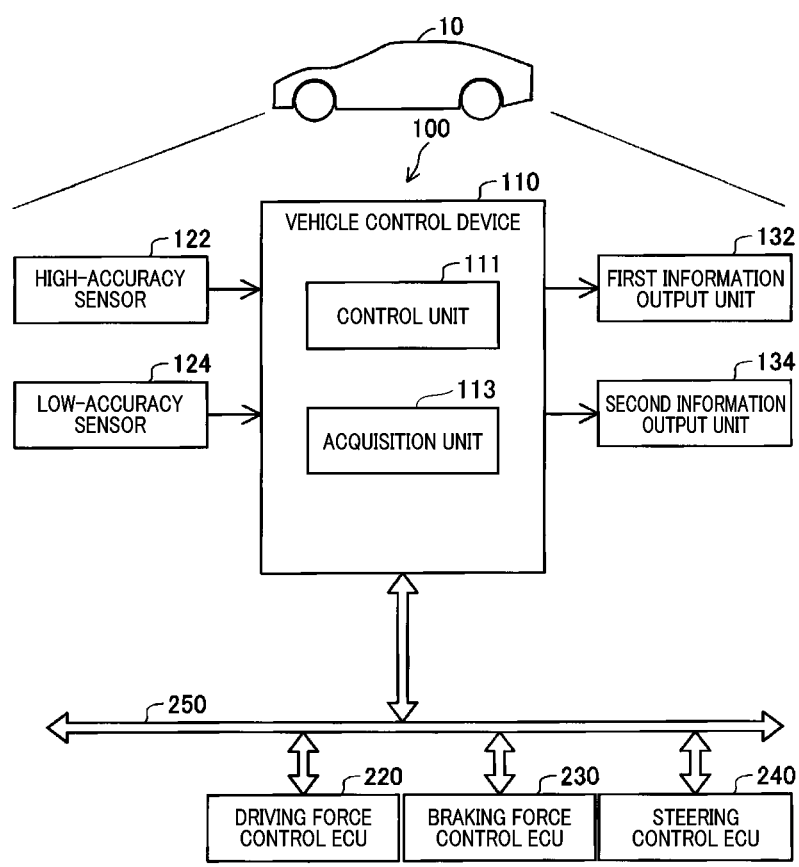
FIG. 1 is a schematic diagram illustrating a configuration of an autonomous driving system.

As shown in FIG. 1, a vehicle 10 includes an autonomous driving control system 100. In the present embodiment, the autonomous driving control system 100 executes autonomous driving of the vehicle 10. In the present embodiment, the autonomous driving control system 100 includes a vehicle control device 110, a high-accuracy sensor 122, a low-accuracy sensor 124, a first information output unit 132, a second information output unit 134, a driving force control ECU (electronic control unit) 220, a braking force control ECU 230, and a steering control ECU 240. The vehicle control device 110, the driving force control ECU 220, the braking force control ECU 230, and the steering control ECU 240 are connected to each other via an on-vehicle network 250. Without being limited to autonomous driving, the vehicle 10 may be driven by the driver's manual driving.

The high-accuracy sensor 122 detects a preceding vehicle traveling ahead in the direction of travel of the vehicle 10. In the present embodiment, the high-accuracy sensor 122 is a millimeter-wave radar device. The detection information of the high-accuracy sensor 122 is referred to as first detection information. The first detection information includes, for example, an inter-vehicle distance or relative speed between the preceding vehicle and the vehicle 10. In the present embodiment, the relative speed is assumed to be plus if the speed of the preceding vehicle is higher than that of the vehicle 10, and is assumed to be minus if the speed of the preceding vehicle is lower than that of the vehicle 10.

The low-accuracy sensor 124, whose maximum detectable distance to a preceding vehicle is larger than the maximum detectable distance of the high-accuracy sensor 122, is a sensor having low ranging accuracy. In the present embodiment, the low-accuracy sensor 124 is a camera. The detection information of the low-accuracy sensor 124 is referred to as second detection information. The second detection information includes, for example, an inter-vehicle distance or relative speed between the preceding vehicle and the vehicle 10.

The first information output unit 132 notifies the occupants of the vehicle 10 of the information related to traveling of the vehicle 10. The first information output unit 132 notifies, for example, the speed of the vehicle 10, and the acceleration/deceleration of the vehicle 10. In the present embodiment, the term "acceleration/deceleration" refers to both of acceleration and deceleration.

The second information output unit 134 notifies the occupants of the vehicle 10 of the inter-vehicle distance between the preceding vehicle and the vehicle 10 calculated using the first detection information and/or the second detection information. The first and second information output units 132 and 134 can be, for example, the display used for the navigation system installed in the vehicle 10, head-up display (HUD), or meters on the instrument panel, and the like. The second information output unit 134 is preferred to be a digital display rather than a mechanical analog meter.

The vehicle control device 110 includes a control unit 111 and an acquisition unit 113. The vehicle control device 110 is configured by a microcomputer or the like that includes a central processing unit (CPU), RAM and ROM, and the functions of these units are achieved by the microcomputer executing the program installed in advance. However, part or all of the functions of these units may be achieved using hardware circuits.

The acquisition unit 113 acquires first detection information derived from the high-accuracy sensor 122 and second detection information derived from the low-accuracy sensor 124.

The control unit 111 performs following control in which the vehicle 10 is controlled so as not to collide with the preceding vehicle, using the first detection information and/or the second detection information acquired by the acquisition unit 113. In the present embodiment, as following control, the control unit 111 controls the vehicle 10 during travelling at a predetermined speed so that the inter-vehicle distance to the preceding vehicle becomes a predetermined distance. The control unit 111 achieves following control by controlling the driving force control ECU 220, the braking force control ECU 230, and the steering control ECU 240. The control unit 111 controls the driving force control ECU 220 and the braking force control ECU 230, for example, to automatically control the travelling speed of the vehicle 10.

The driving force control ECU 220 is an electronic control device that controls the actuators, such as the engine, that generate a driving force of the vehicle. If the driver manually drives the vehicle, the driving force control ECU 220 controls the power source, i.e., the engine or the electric motor, according to the operation amount of the accelerator pedal. If the vehicle is autonomously driven, the driving force control ECU 220 controls the power source according to the required driving force calculated by the control unit 111.

The braking force control ECU 230 is an electronic control device that controls the brake actuator that generates a braking force of the vehicle. If the driver manually drives the vehicle, the braking force control ECU 230 controls the brake actuator according to the operation amount of the brake pedal. If the vehicle is autonomously driven, the braking force control ECU 230 controls the brake actuator according to the required braking force calculated by the control unit 111.

The steering control ECU 240 is an electronic control device that controls the motor generating steering torque of the vehicle. If the driver manually drives the vehicle, the steering control ECU 240 controls the motor according to the operation of the steering wheel to generate assist torque for the steering operation. Thus, the driver can operate the steering wheel with only a small amount of power. If the vehicle is autonomously driven, the steering control ECU 240 steers the vehicle by controlling the motor according to the required steering angle calculated by the control unit 111.

The control unit 111 controls the first and second information output units 132 and 134. The control unit 111 controls the first information output unit 132, for example, to inform the occupants of the vehicle 10 about details of following control.

Figure 2:
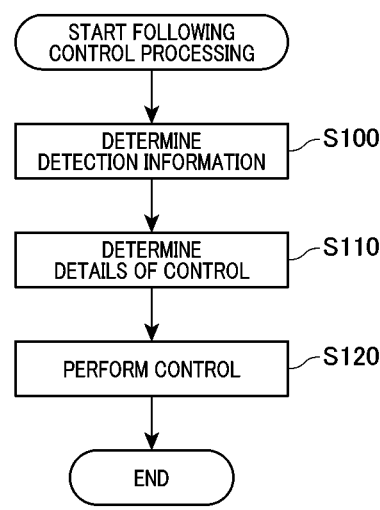
FIG. 2 is a flowchart illustrating an example of following control processing.

FIG. 2 shows following control processing that is a series of processes in which the vehicle control device 110 performs following control for the vehicle 10. In the present embodiment, this processing is repeatedly executed, e.g., every 500 ms, by the vehicle control device 110 during autonomous driving of the vehicle 10.

At step S100, the acquisition unit 113 determines detection information used for following control. For example, the control unit 111 determines detection information used for following control, according to the detection conditions or detection information of the high-accuracy sensor 122 or the low-accuracy sensor 124. In the present embodiment, the control unit 111 determines detection information used for following control in any one of three patterns, i.e., a pattern of using the first detection information, a pattern of using only the second detection information, and a pattern of using no detection information.

Figure 3:
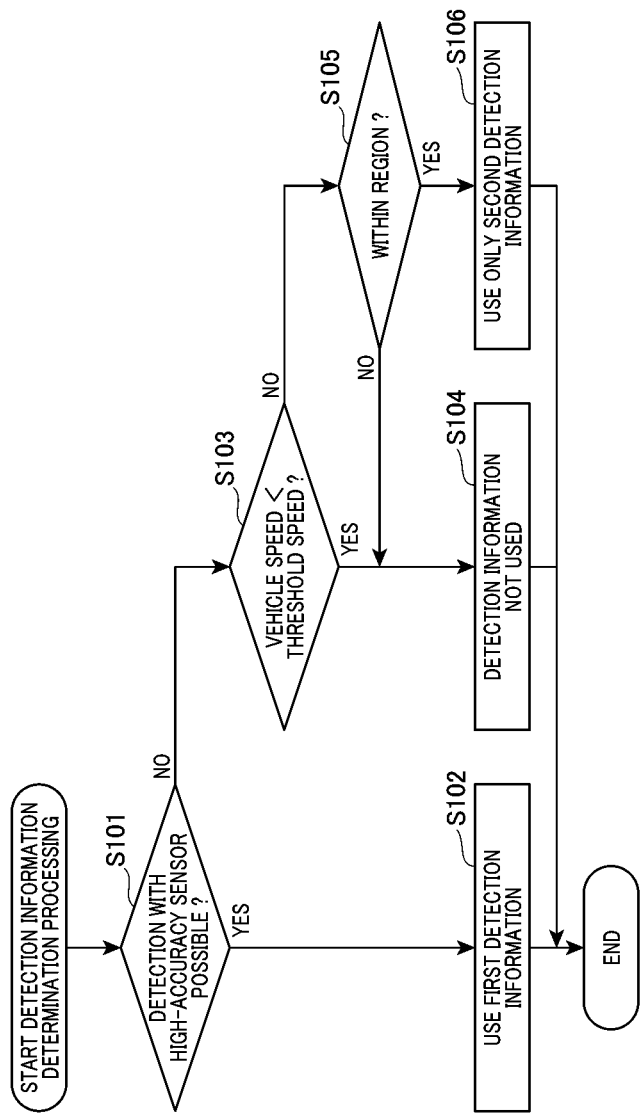
FIG. 3 is a flowchart illustrating an example of detection information determination processing.

FIG. 3 shows detection information determination processing which is an example of the processing performed at step S100 (FIG. 2) for determining detection information used for following control. At step S101, the control unit 111 determines whether the high-accuracy sensor 122 can detect the preceding vehicle. For example, the control unit 111 determines whether the inter-vehicle distance between the preceding vehicle and the vehicle 10 in the second detection information is smaller than the maximum distance to the preceding vehicle detectable by the high-accuracy sensor 122. If the preceding vehicle is detectable by the high-accuracy sensor 122, i.e., if the inter-vehicle distance is smaller than the maximum distance to the preceding vehicle detectable by the high-accuracy sensor 122, the control unit 111 allows control to proceed to step S102 at which the control unit 111 determines the first detection information to be used for following control. In other words, the control unit 111 determines to perform following control using the first detection information. If the preceding vehicle is not detectable by the high-accuracy sensor 122, i.e., if the inter-vehicle distance is not less than the maximum distance to the preceding vehicle detectable by the high-accuracy sensor 122, the control unit 111 allows control to proceed to step S103.

At step S103, the control unit 111 determines whether the speed of the vehicle 10 is lower than a predetermined threshold speed. The threshold speed can be determined experimentally or empirically in advance. If the speed of the vehicle 10 is lower than the threshold speed, the control unit 111 allows control to proceed to step S104 at which the control unit 111 determines to perform following control without using detection information. If the vehicle 10 travels at a low speed of less than the threshold speed, there is only a low probability that the inter-vehicle distance to the preceding vehicle becomes small and, accordingly, there is only a low probability that the vehicle 10 collides with the preceding vehicle. Therefore, the vehicle can travel safely without the necessity of performing control using the second detection information. If the speed of the vehicle 10 is higher than the threshold speed, the control unit 111 allows control to proceed to step S105.

At step S105, the control unit 111 determines whether the relationship between the inter-vehicle distance to the preceding vehicle and the relative speed to the preceding vehicle is in a predetermined region. The predetermined region can be determined experimentally or empirically in advance. Details of the predetermined region will be described later. If the relationship between the inter-vehicle distance to the preceding vehicle and the relative speed to the preceding vehicle is in the region, control proceeds to step S106 at which the control unit 111 determines only the second detection information to be used for following control. In other words, the control unit 111 determines to perform following control using only the second detection information. If the relationship between the inter-vehicle distance to the preceding vehicle and the relative speed to the preceding vehicle is not in the region, control returns to step S104.

Figure 4:
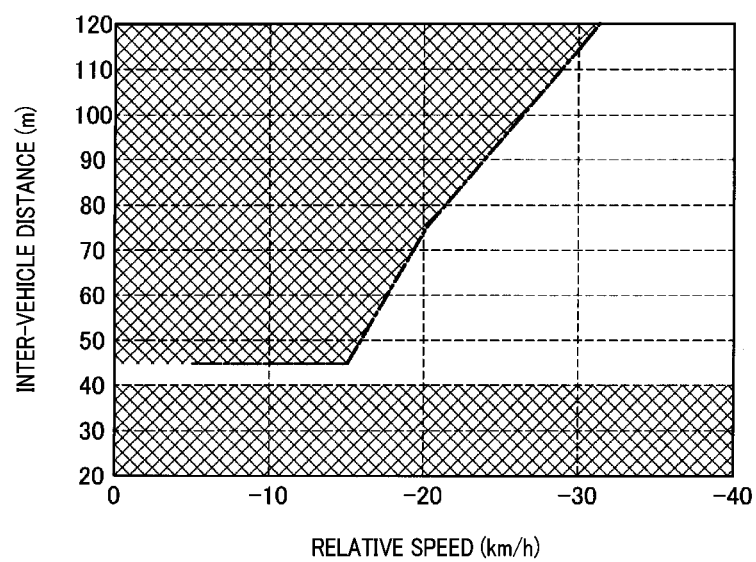
FIG. 4 is a diagram illustrating an example of peripheral information on the shape of road demarcation lines.

For example, referring to FIG. 4, if the inter-vehicle distance is 40 m or smaller, the preceding vehicle is detectable by the high-accuracy sensor 122. Therefore, the control unit 111 can perform following control using the first detection information. Therefore, the control unit 111 does not perform following control using only the second detection information.

At step S110 (FIG. 2), the control unit 111 determines details of following control using the detection information determined at step S100. If following control is performed using only the second detection information, the control unit 111 reduces the degree of change in the control of the vehicle 10, as compared to the case of performing following control using the first detection information. In the present embodiment, if following control is performed using only the second detection information, the control unit 111 reduces change in speed of the vehicle 10, as compared to the case of performing control using the first detection information. The following description will be given taking an example of performing following control using only the second detection information. Based on the second detection information, the control unit 111 determines whether a predetermined control pattern is met and then determines control details. The control details may include, for example, deceleration, acceleration, and constant speed traveling.

<Control Pattern 1>
The vehicle is decelerated if the predicted time until collision between the preceding vehicle and the vehicle 10 is not more than the predetermined threshold.

<Control Pattern 2>
The vehicle is decelerated if the inter-vehicle distance between the preceding vehicle and the vehicle 10 is not more than the predetermined threshold.

<Control Pattern 3>
The vehicle is decelerated if the relative speed between the preceding vehicle and the vehicle 10 is not more than the predetermined threshold.

<Control Pattern 4>
The vehicle is accelerated if the inter-vehicle distance between the preceding vehicle and the vehicle 10 is not less than the predetermined threshold, and the relative speed between the preceding vehicle and the vehicle 10 is not less than the predetermined threshold.

<Control Pattern 5>
The vehicle is not accelerated if the vehicle 10 is determined to be accelerated using only the second detection information.

<Control Pattern 6>
When switching the following control using the first detection information to the following control using only the second detection information, the deceleration in the following control using the first detection information is maintained for a predetermined period of time.

<Control Pattern 7>
When switching the following control using the first detection information to the following control using only the second detection information, the vehicle is accelerated for a predetermined period of time at an acceleration smaller than in the following control using the first detection information.

The predicted time in Control Pattern 1 is calculated, for example, by dividing the inter-vehicle distance between the preceding vehicle and the vehicle 10 by the relative speed.

Control Patterns 1 to 7 may be appropriately combined with other control patterns. The thresholds in Control Patterns 1 to 7 can be determined in advance through simulations or experiments. The following description will be provided taking an example of using Control Patterns 1 to 3 as patterns for determining control details. Specifically, if following control is performed using only the second detection information, the control unit 111 decelerates the vehicle 10 if one or more of the predicted time until collision with the preceding vehicle, the inter-vehicle distance between the preceding vehicle and the vehicle 10, and the relative speed between the preceding vehicle and the vehicle 10 are not more than the predetermined thresholds, or otherwise, does not decelerate the vehicle 10.

At step S120 (FIG. 2), the control unit 111 executes the control details determined at step S110. In the present embodiment, the control unit 111 provides a notification of the information related to traveling of the vehicle 10, i.e., the control details determined at step S110. For example, in the case of performing following control using only the second detection information, the control unit 111 controls the first information output unit 132 so that the occupants of the vehicle 10 are notified of the information related to traveling of the vehicle 10 in a different mode from the case of performing following control using the first detection information. The different mode refers to, for example, a mode in which the speed or acceleration/deceleration of the vehicle 10 is displayed with different colors or brightness. Specifically, if following control is performed using the first detection information, the control unit 111 controls the first information output unit 132 to display the information related to traveling of the vehicle 10 in yellow green with high brightness, and if it is performed using only the second detection information, to display the information related to traveling of the vehicle 10 in blue with low brightness. Also, if following control is performed using only the second information, the control unit 111 may control the first information output unit 132 to blink the information display related to traveling of the vehicle 10, or may control the first information output unit 132 to make a notification by text or voice.

Figure 5:
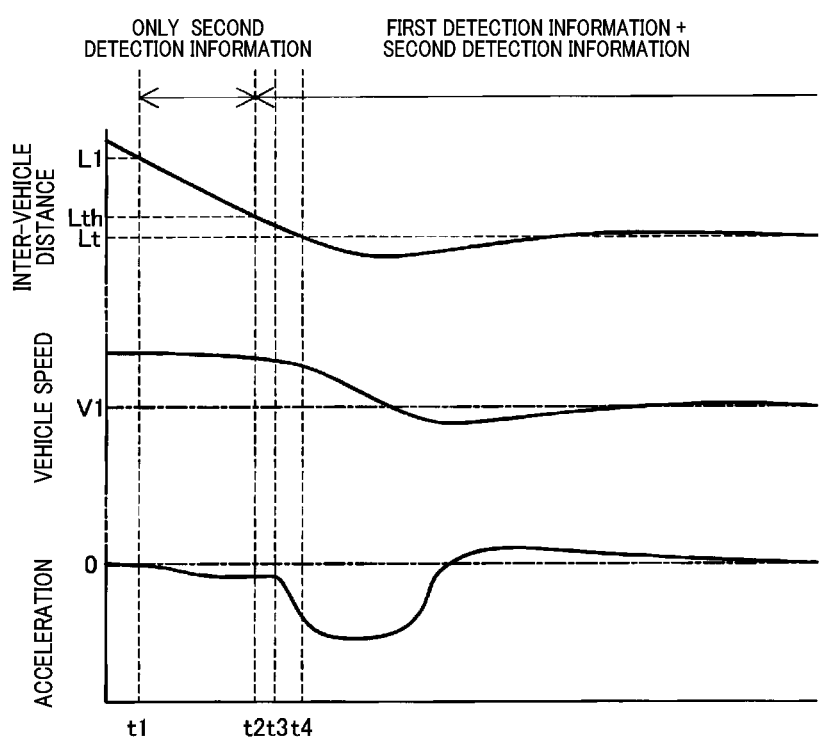
FIG. 5 is a time chart illustrating an example of following control.

Referring to FIG. 5, a description will be given taking an example of starting following control at timing t1. Referring to FIG. 5, a description will be given of a traveling example in which following control using only the second detection information is performed in a period between timing t1 and timing t2, and control is switched at timing t2 to following control using both of the first and second detection information. Also, referring to FIG. 5, an example of the case in which the preceding vehicle travels at a constant speed V1 will be described.

In FIG. 5, the graph at the top shows inter-vehicle distance between the vehicle 10 and the preceding vehicle. In the middle graph, the solid line indicates vehicle speed of the vehicle 10, and the dash-dot-dash line indicates speed of the preceding vehicle. In the graph at the bottom, the solid line indicates acceleration/deceleration of the vehicle 10, and the dash-dot-dash line indicates acceleration/deceleration of the preceding vehicle.

As shown in the top graph, the inter-vehicle distance at timing t1 is a distance L1. As shown in the middle graph, the vehicle speed at timing t1 is faster than a speed V1 of the preceding vehicle. The control unit 111 performs following control so that the vehicle speed will be V1 and the inter-vehicle distance will be a predetermined distance Lt. In order to set the vehicle speed to V1, the control unit 111 performs control at timing t1, as shown in the bottom graph, to decelerate the vehicle 10. In the present embodiment, the control unit 111 performs control to gradually increase the deceleration.

As shown in the top graph, the inter-vehicle distance becomes a distance Lth at timing t2 at which the preceding vehicle becomes detectable by the high-accuracy sensor 122. Accordingly, at timing t2, the control unit 111 switches the following control using only the second detection information to following control using the first detection information. As shown in the bottom graph, during the period between timing t2 and timing t3, the control unit 111 decelerates the vehicle at a deceleration at timing t2 to ease discomfort due to change in following control, i.e., due to switching from following control using only the second detection information to following control using the first detection information. From timing t3, the control unit 111 performs control so that the vehicle 10 is decelerated at a higher deceleration than in the period between timing t2 and timing t3.

As shown in the top graph, at timing t4, the inter-vehicle distance is approximated to the distance Lt. Accordingly, as shown in the bottom graph, the control unit 111 performs control so that the slope of deceleration becomes gentler from timing t4.

If following control is performed using only the second detection information, the control unit 111 reduces change in speed of the vehicle 10, as compared to the case of performing the control using the first detection information and the second detection information. Accordingly, the slope of deceleration in the period between timing t1 and timing t2 is smaller than the slope of deceleration in the period between timing t3 and timing t4.

According to the vehicle control device 110 of the present embodiment described above, significant change in control details can be suppressed in the control using only the second detection information. Therefore, drastic change can be suppressed when switching the following control using both of the first detection information having high ranging accuracy and the second detection information having low ranging accuracy, to the following control using only the second detection information having low ranging accuracy. Since significant change in control details can be suppressed in the following control using only the second detection information, details of the following control using both of the first and second detection information before being switched to the following control using only the second detection information tends to be maintained during the following control using only the second detection information. Therefore, there is little change when the following control using only the second detection information is switched again to the following control using both of the first and second detection information. Accordingly, discomfort can be eased when switching between the control using only the low-accuracy sensor and the control using the high-accuracy sensor.

Furthermore, when performing following control using only the second detection information, the control unit 111 reduces change in the vehicle speed V1 of the vehicle 10, as compared to when performing the control using the first detection information. Therefore, excessive change in vehicle speed can be suppressed in the following control using only the second detection information. Thus, discomfort can be eased when switching between the following control using only the second detection information and the following control using the first detection information.

Furthermore, if the speed of the vehicle 10 is lower than the predetermined threshold speed, the control unit 111 does not perform the following control using only the second detection information. Therefore, even when the first detection information is not obtained from the high-accuracy sensor 122, as long as the vehicle travels at a low speed of less than the threshold speed, the following control using only the second detection information is not performed. Therefore, when the vehicle travels at a low speed of less than the threshold speed, discomfort, which is caused when switching the control using only the second detection information to the following control using the first detection information, can also be eased, as compared to the mode of performing following control using only the second detection information.

Furthermore, when performing following control using only the second detection information, the control unit 111 decelerates the vehicle 10 if one or more of the predicted time until collision with the preceding vehicle, the inter-vehicle distance between the preceding vehicle and the vehicle 10, and the relative speed between the preceding vehicle and the vehicle 10 are not more than the predetermined thresholds. In other words, the vehicle 10 can be decelerated only when there is a high probability of colliding with the preceding vehicle. Therefore, deceleration can be performed only in the situation in which deceleration is necessary. Accordingly, excessive following control of the vehicle using only the second detection information can be suppressed, thereby reducing discomfort caused when switching the control using only the second detection information to the following control using the first detection information.

Furthermore, when performing following control using only the second detection information, the control unit 111 does not accelerate the vehicle 10 if the vehicle 10 is determined to be accelerated using only the second detection information. Therefore, under the control based on the low-accuracy sensor having low ranging accuracy, the probability of colliding with the preceding vehicle can be avoided.

Furthermore, when performing following control using only the second detection information, the control unit 111 controls the first information output unit 132 to provide a notification in a different mode from the case of performing following control using the first detection information. Therefore, the occupants can be informed of the fact that control that is not the control using both of the high-accuracy sensor and the low-accuracy sensor is being performed.

B. Second Embodiment

The second embodiment is different from the first embodiment in that the control unit 111 controls the second information output unit 134 in following control. The configuration of the autonomous driving control system of the second embodiment, which is the same as that of the first embodiment, is omitted from description.

In the present embodiment, when performing following control using only the second detection information by controlling the second information output unit 134, the control unit 111 controls the second information output unit 134 to reduce the frequency of change in notification content, as compared to the case of performing following control using the first detection information. In the present embodiment, the frequency of change in notification content refers to a concept including the interval of updating the inter-vehicle distance to be notified. For example, when performing following control using the first detection information, the control unit 111 controls the second information output unit 134 to provide a notification of change in inter-vehicle distance at first intervals. More specifically, when performing following control using the first detection information, for example, the control unit 111 controls the second information output unit 134 to make a notification as follows.

<Notification Content Issued From Second Information Output Unit 134 When Performing Following Control Using First Detection Information>

Inter-vehicle distance in 1 m increments obtained by rounding the inter-vehicle distance in the first detection information to the nearest integer.

When performing following control using only the second detection information, the control unit 111 controls the second information output unit 134 to provide a notification of a distance that is predetermined as an inter-vehicle distance at second intervals longer than the first intervals. More specifically, when performing following control using only the second detection information, for example, the control unit 111 controls the second information output unit 134 to make a notification as follows.

<Notification Content Issued From Second Information Output Unit 134 When Performing Following Control Using Only Second Detection Information>

The inter-vehicle distance in the second detection information is less than 40 m: Less than 40 m The inter-vehicle distance in the second detection information is 40 m or more and less than 60 m: 50 m The inter-vehicle distance in the second detection information is 60 m or more and less than 80 m: 70 m The inter-vehicle distance in the second detection information is 80 m or more: 80 m or more When switching the following control using only the second detection information to the following control using the first detection information, the control unit 111 can control the second information output unit 134 to provide notifications of inter-vehicle distances which are calculated so that the inter-vehicle distance obtained from only the second detection information gradually changes to the inter-vehicle distance obtained using the first detection information. For example, if the inter-vehicle distance obtained from only the second detection information is 50 m and the inter-vehicle distance obtained using the first detection information is 41 m, the control unit 111 controls the second information output unit 134 to provide notifications of inter-vehicle distances in 2 m decrements of "50 m, 48 m, 46 m . . ." from 50 m to 41 m at time intervals experimentally determined in advance, instead of controlling the notification content issued from the second information output unit 134 from 50 m to 41 m.

Also, when switching the following control using the first detection information to the following control using only the second detection information, the control unit 111 can control the second information output unit 134 to provide notifications of inter-vehicle distances which are calculated so that the inter-vehicle distance obtained from the first detection information gradually changes to the inter-vehicle distance obtained using only the second detection information. It should be noted that, when switching the following control using the first detection information to the following control using only the second detection information, the control unit 111 may control the second information output unit 134 to provide a notification of an inter-vehicle distance obtained using the first detection information, instead of an inter-vehicle distance obtained using the second detection information.

According to the vehicle control device 110 of the second embodiment described above, the control unit 111 performs control so that the frequency of notification issued from the second information output unit 134 is reduced in the control using only the second detection information. Accordingly, discomfort can be eased when switching between the control using only second detection information and the control using the first detection information.

Furthermore, when performing following control using the first detection information, the control unit 111 controls the second information output unit 134 to provide a notification of change in inter-vehicle distance at first intervals. Furthermore, when performing following control using only the second detection information, the control unit 111 controls the second information output unit 134 to provide a notification of a distance that is predetermined as an inter-vehicle distance at second intervals longer than the first intervals. Thus, when performing following control using only the second detection information, the frequency of change in notification content can be reduced, as compared to the case of performing following control using the first detection information.

Furthermore, when switching the following control using only the second detection information to the following control using the first detection information, the control unit 111 controls the second information output unit 134 to provide notifications of inter-vehicle distances which are calculated so that the inter-vehicle distance obtained from only the second detection information gradually changes to the inter-vehicle distance obtained using the first detection information. Therefore, discomfort due to change in control can be eased when switching the following control using only the second detection information to the following control using the first detection information.

Furthermore, when switching the following control using the first detection information to the following control using only the second detection information, the control unit 111 controls the second information output unit 134 to provide notifications of inter-vehicle distances which are calculated so that the inter-vehicle distance obtained from the first detection information gradually changes to the inter-vehicle distance obtained using only the second detection information, or to provide a notification of an inter-vehicle distance obtained from the first detection information. Therefore, discomfort due to change in following control can be eased when switching the following control using the first detection information to the following control using only the second detection information.

C. Other Embodiments (C1) In the embodiments described above, the high-accuracy sensor 122 is a millimeter-wave radar device, and the low-accuracy sensor 124 is a camera. Without being limited to this, the combination of the high-accuracy sensor 122 and the low-accuracy sensor 124 may include, for example, laser sensor and camera, stereo camera and telephoto camera, and ultrasonic sensor and camera.

(C2) In the embodiments described above, the vehicle control device 110 repeatedly executes the following control processing (FIG. 4) during autonomous traveling of the vehicle 10. Instead of this, the vehicle control device 110 may perform following control when predetermined conditions are satisfied. The predetermined conditions may be, for example, the inter-vehicle distance between the vehicle 10 and the preceding vehicle being not more than a predetermined threshold.

(C3) In the embodiments described above, if following control is determined to be performed at step S100 (FIG. 2) using the first detection information, the control unit performs following control using the first detection information and the second detection information. Without being limited to this, the control unit 111 may perform following control using only the first detection information.

(C4) In the embodiments described above, the control unit 111 uses predetermined thresholds in Control Patterns 1 to 3 when determining details of following control at step S110 (FIG. 2). Instead of this, the control unit 111 may determine thresholds according to the detection conditions of the high-accuracy sensor 122. For example, in the first case of detection conditions of the high-accuracy sensor 122, the control unit 111 may determine a threshold with a larger value than in the second case of detection conditions of the high-accuracy sensor 122 being better than the first case. In other words, in the first case of detection conditions of the high-accuracy sensor 122 being worse than in the second case, the control unit 111 may determine a threshold with a larger value. The first case where the detection conditions of the high-accuracy sensor 122 are worse may be, for example, the case where the vehicle travels in a tunnel, or the case where the vehicle travels alongside a soundproof wall, or the case where the vehicle travels under an overpass. According to this mode, if the detection conditions of the high-accuracy sensor are worse, deceleration control can be performed using only the second detection information without using the first detection information. Thus, the vehicle can travel safely. In the first case, the control unit 111 may determine a threshold with a smaller value than in the second case. The threshold is preferred to be determined with a value which is different between the first case and the second case.

(C5) In the embodiments described above, the control unit 111 uses Control Patterns 1 to 3 as patterns for determining details of control at step S110 (FIG. 2). Without being limited to this, for example, Control Patterns 4 and 5 may be used. Specifically, when performing following control using only the second detection information, the control unit 111 may perform control of not accelerating the vehicle 10 if the inter-vehicle distance between the preceding vehicle and the vehicle 10 is not less than a predetermined distance and if the relative speed between the preceding vehicle and the vehicle 10 is not less than a predetermined speed.

(C6) In the embodiments described above, when performing following control using only the second detection information, the control unit 111 gradually increases the deceleration if the vehicle 10 is determined to be decelerated using only the second detection information. Instead of this, when performing following control using only the second detection information, the control unit 111 may decelerate the vehicle 10 at a predetermined fixed deceleration if the vehicle 10 is determined to be decelerated using only the second detection information. The fixed deceleration may be, for example, 0.49 m/s$^2$. With this mode, the vehicle can be controlled irrespective of the content of the second detection information in the control using only the second detection information. Thus, if the detection of the low-accuracy sensor is in error, the control behavior of the vehicle is prevented from deteriorating.

The present disclosure should not be construed as being limited to the embodiments described above, but can be achieved with various configurations without departing from the scope thereof. For example, the technical features of the embodiments corresponding to the technical features of the modes described in the Summary of the Invention can be replaced or combined as appropriate in order to solve the issues set forth above or to achieve part or all of the advantageous effects described above. The technical features, unless they are described as being essential in the present specification, can be deleted as appropriate.

The control unit and the processing thereof described in the present disclosure may be implemented by a dedicated computer which is provided by configuring a processor and a memory that are programmed to perform one or more embodied functions. Alternatively, the control unit and the processing thereof described in the present disclosure may be implemented by a dedicated computer which is provided by configuring a processor with one or more dedicated hardware logic circuits. Alternatively, the control unit and the processing thereof described in the present disclosure may be implemented by one or more dedicated computers which are configured by combining a processor and a memory that are programmed to perform one or more functions, with a processor that is configured by one or more hardware logic circuits. Furthermore, the computer program may be stored in a computer readable non-transitory tangible recording medium, as instructions to be executed by the computer.

What is claimed is:

1. A vehicle control device for a vehicle equipped with a high-accuracy sensor and a low-accuracy sensor to detect a preceding vehicle, the low-accuracy sensor being able to detect a distance to a preceding vehicle larger than a maximum distance to a preceding vehicle detectable by the high-accuracy sensor, and having low ranging accuracy, the vehicle control device comprising:
   an acquisition unit configured to acquire first detection information derived from the high-accuracy sensor and second detection information derived from the low-accuracy sensor; and
   a control unit configured to perform following control in which the vehicle is controlled so as not to collide with the preceding vehicle in any one of three controls, a first control of using the first detection information, a second control of using no detection information, and a third control of using only the second detection information, wherein:
   the control unit is further configured to, when the high-accuracy sensor cannot detect the preceding vehicle and the vehicle travels at a speed greater than or equal to a predetermined threshold speed, refer to definition information defining a range of a relative speed to the preceding vehicle depending on an inter-vehicle distance to the preceding vehicle as a performing condition of the third control, and determine whether the relative speed to the preceding vehicle relative to the inter-vehicle distance to the preceding vehicle is within the range defined as the performing condition of the third control, and the control unit is further configured to, when determining that the relative speed to the preceding vehicle relative to the inter-vehicle distance to the preceding vehicle is within the range defined as the performing condition of the third control, perform the third control and decrease a change in the speed or an acceleration of the vehicle that is based on the second detection information, as compared to when performing the first control.

2. The vehicle control device according to claim 1, wherein
the control unit is further configured to perform the second control corresponding to the following control without using the second detection information when the vehicle travels at the speed lower than the predetermined threshold speed.

3. The vehicle control device according to claim 1, wherein
the control unit is further configured to perform the second control corresponding to the following control without using the second detection information when determining that the relative speed to the preceding vehicle relative to the inter-vehicle distance to the preceding vehicle is not within the range defined as the performing condition of the third control.

4. The vehicle control device according to claim 1, wherein
the control unit is further configured to, when performing the third control corresponding to the following control using only the second detection information, not perform vehicle deceleration control for allowing the inter-vehicle distance to become a predetermined distance, when one or more of a predicted time until collision with the preceding vehicle, an inter-vehicle distance between the preceding vehicle and the vehicle, and a relative speed between the preceding vehicle and the vehicle are not less than predetermined thresholds.

5. The vehicle control device according to claim 4, wherein
the thresholds are determined to be values different between first and second detection conditions of the high-accuracy sensor, the second detection condition being better for detection of the preceding vehicle by the high-accuracy sensor than the first detection condition.

6. The vehicle control device according to claim 5, wherein
in the first detection condition, the thresholds are determined to be larger than in the second detection condition.

7. The vehicle control device according to claim 1, wherein
the control unit is further configured to, when performing the third control corresponding to the following control using only the second detection information, decelerate the vehicle at a predetermined fixed deceleration when the vehicle is determined to be decelerated using only the second detection information.

8. The vehicle control device according to claim 1, wherein
the control unit is further configured to, when performing the third control corresponding to the following control using only the second detection information, not accelerate the vehicle.

9. The vehicle control device according to claim 1, wherein
the control unit is further configured to, when switching the first control to the third control, perform the following control to decelerate the vehicle while maintaining a deceleration in the first control or to accelerate the vehicle at an acceleration smaller than in the first control, during a predetermined period of time after terminating the first control and before starting the third control.

10. The vehicle control device according to claim 1, wherein
the control unit is further configured to, when switching the first control to the third control, perform the following control to decelerate the vehicle while maintaining a deceleration in the first control or to accelerate the vehicle at an acceleration smaller than in the first control, during a predetermined period of time.

11. The vehicle control device according to claim 1, wherein
the control unit is further configured to, when switching the third control to the first control, perform the following control to decelerate the vehicle while maintaining a deceleration in the third control or to accelerate the vehicle at an acceleration smaller than in the first control, during a predetermined period of time after terminating the third control and before starting the first control.

12. The vehicle control device according to claim 1, wherein
the control unit is further configured to, when switching the third control to the first control, perform the following control to decelerate the vehicle while maintaining a deceleration in the third control or to accelerate the vehicle at an acceleration smaller than in the first control and larger than in the third control, during a predetermined period of time.

13. The vehicle control device according to claim 1, wherein
the control unit is further configured to control a first information output unit installed in the vehicle, the first information output unit providing a notification to an occupant of the vehicle, the notification being of information related to traveling of the vehicle; and
the control unit is further configured to, when performing the following control using only the second detection information, allow notification to be provided in a mode different from when performing the first control.

14. The vehicle control device according to claim 1, wherein
the control unit is further configured to control a second information output unit installed in the vehicle, the second information output unit providing a notification to an occupant of the vehicle about an inter-vehicle distance between the preceding vehicle and the vehicle, the inter-vehicle distance being calculated using at least either of the first detection information and the second information; and
the control unit is further configured to, when performing the third control, control the second information output unit to reduce a frequency of change in notification content, as compared to when performing the first control.

15. The vehicle control device according to claim 14, wherein
the control unit is further configured to, when performing the first control, control the second information output unit to provide a notification of change in inter-vehicle distance at first intervals; and the control unit is further configured to, when performing the third control, control the second information output unit to provide a notification of a distance predetermined as the inter-vehicle distance at second intervals longer than the first intervals.

16. The vehicle control device according to claim 14, wherein the control unit is further configured to, when switching the third control to the first control, control the second information output unit to provide notifications of the inter-vehicle distances which are calculated so that the inter-vehicle distance obtained from only the second detection information gradually changes to the inter-vehicle distance obtained using the first detection information.

17. The vehicle control device according to claim 14, wherein the control unit is further configured to, when switching the first control to the third control, control the second information output unit to provide notifications of the inter-vehicle distances which are calculated so that the inter-vehicle distance obtained using the first detection information gradually changes to the inter-vehicle distance obtained from only the second detection information, or to provide a notification of the inter-vehicle distance obtained using the first detection information.

18. The vehicle control device according to claim 1, wherein the high-accuracy sensor is a millimeter-wave radar device or a laser sensor; and the low-accuracy sensor is a camera.

19. A vehicle control device for a vehicle equipped with a high-accuracy sensor and a low-accuracy sensor to detect a preceding vehicle, the low-accuracy sensor being able to detect a distance to a preceding vehicle larger than a maximum distance to a preceding vehicle detectable by the high-accuracy sensor, and having low ranging accuracy, the vehicle control device comprising:

one or more processors; and one or more memories communicatively coupled to the processor and having a set of computer-executable instructions stored thereon that cause the processor to implement operations comprising:

acquiring first detection information derived from the high-accuracy sensor and second detection information derived from the low-accuracy sensor; and performing following control in which the vehicle is controlled so as not to collide with the preceding vehicle, in any one of three controls, a first control of using the first detection information, a second control of using no detection information, and a third control of using only the second detection information;

when the high-accuracy sensor cannot detect the preceding vehicle and the vehicle travels at a speed greater than or equal to a predetermined threshold speed, referring to definition information defining a range of a relative speed to the preceding vehicle depending on an inter-vehicle distance to the preceding vehicle as a performing condition of the third control;

determining whether the relative speed to the preceding vehicle relative to the inter-vehicle distance to the preceding vehicle is within the range defined as the performing condition of the third control; and when determining that the relative speed to the preceding vehicle relative to the inter-vehicle distance to the preceding vehicle is within the range defined as the performing condition of the third control, performing the third control and decreasing a change in the speed or an acceleration of the vehicle that is based on the second detection information, as compared to when performing the first control.

* * * * *